(12) United States Patent
Zhang et al.

(10) Patent No.: US 12,561,621 B2
(45) Date of Patent: Feb. 24, 2026

(54) SYSTEMS AND METHODS FOR INTERFACING WITH A SERVER OVER A NETWORK

(71) Applicant: Capital One Services, LLC, McLean, VA (US)

(72) Inventors: Jie Zhang, Potomac, MD (US); Joshua Edwards, Cherry Hill, NJ (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/798,724

(22) Filed: Aug. 8, 2024

(65) Prior Publication Data

US 2026/0044786 A1     Feb. 12, 2026

Related U.S. Application Data

(63) Continuation of application No. 17/984,593, filed on Nov. 10, 2022, now abandoned.

(51) Int. Cl.
G06N 20/20          (2019.01)
(52) U.S. Cl.
CPC ................................... G06N 20/20 (2019.01)
(58) Field of Classification Search
CPC ..................................................... G06N 20/20
USPC .......................................................... 706/12
See application file for complete search history.

(56) References Cited

U.S. PATENT DOCUMENTS

| | | | |
|---|---|---|---|
| 11,900,755 B1 * | 2/2024 | Bueche, Jr. .......... | G07D 7/2016 |
| 2020/0118064 A1 * | 4/2020 | Perrella ............... | G06F 16/2246 |
| 2022/0366513 A1 * | 11/2022 | Vadlamudi ............ | H04L 9/3247 |
| 2023/0410469 A1 * | 12/2023 | Muehlenstaedt ...... | G06V 20/58 |

OTHER PUBLICATIONS

Agrawal et al., "Automated bank cheque verification using image processing and deep learning methods", Multimedia Tools and Applications (2021) 80:5319-5350, 2021 (Year: 2021).*

* cited by examiner

*Primary Examiner* — Tsu-Chang Lee
(74) *Attorney, Agent, or Firm* — Foley & Lardner LLP

(57) ABSTRACT

A system for interfacing with a server over a network to improve efficiency of image processing using multiple machine learning models. The system receives a captured image that is captured via a mobile application and interfaces with the server, over the network, and via an application program interface (API) to determine that a reference image, required for use of the first machine learning model, has not been provided for the captured image. The system further reserves an execution of the second machine learning model for the captured image until the first machine learning model is insufficient for the captured image and performs the execution of the second machine learning model for the captured image based on reserving the execution of the second machine learning model until the first machine learning model is insufficient for the captured image and based on determining that the reference image is not provided for the captured image.

19 Claims, 6 Drawing Sheets

APPLICATIONS 686

MODULES 684

DATA 682

OPERATING SYSTEM 680

AUTHENTICATOR ~150

COMPUTING DEVICE ~600

PROCESSOR(S) ~610

MEMORY ~620

~630

STORAGE DEVICE(S) ~640

INPUT DEVICE(S) ~650

OUTPUT DEVICE(S) ~660

COMMUNICATION CONNECTION(S) ~670

SECOND COMPUTING DEVICE ~602

NETWORK ~690

SYSTEMS AND METHODS FOR INTERFACING WITH A SERVER OVER A NETWORK

SUMMARY OF THE INVENTION

The following presents a simplified summary of the disclosure to provide a basic understanding of some aspects. This summary is not an extensive overview of the disclosure. It is not intended to identify key/critical elements of the disclosure or to delineate the scope of the disclosure. Its sole purpose is to present some concepts of the disclosure in a simplified form as a prelude to the more detailed description presented later.

According to one aspect, disclosed embodiments can include a system that comprises a processor coupled to a memory that includes instructions that, when executed by the processor, cause the processor to search for a reference image in response to receipt of a captured image, compare the reference image to the captured image when the reference image is available. The instructions can also cause the processor to invoke a machine learning model when the reference image is unavailable. The instructions can also cause the processor to initiate a security control after a predetermined time without receipt of approval. Further, the instructions can cause the processor to select the security control based on the similarity score. The instructions can further cause the processor to invoke a second machine learning model on the captured image, wherein the second machine learning model predicts the likelihood that the captured image has been altered based on analysis of colors in the captured image. Furthermore, in one instance, the captured image can be produced by an image captured device of a mobile device.

In accordance with another aspect, the operations include searching for a reference image in response to receipt of a captured image, comparing the reference image to the captured image when the reference image is available. The operations can also include invoking a machine learning model on handwriting when the reference image is unavailable, in which the machine learning model returns a similarity score that captures the similarity of the handwriting on the check to a handwriting profile. The operations can also comprise requesting the handwriting profile from a server. Furthermore, the operations can comprise invoking a second machine learning model on the captured image, wherein the second machine learning model predicts the likelihood that the captured image has been altered based on analysis of colors in the captured image.

According to yet another aspect, disclosed embodiments can include a computer-implemented method. The method can comprise receiving a captured image. The method can further comprise invoking a first machine learning model to predict whether there is an image match or mismatch and invoking a second machine learning model to predict whether there is a handwriting match or mismatch. Further, the method can comprise interfacing with a server over a network after receiving the captured image and requesting the handwriting profile.

To the accomplishment of the foregoing and related ends, certain illustrative aspects of the disclosure are described herein in connection with the following description and the annexed drawings. These aspects are indicative, however, of but a few of the various ways in which the principles of the disclosure can be employed. The subject disclosure is intended to include all such aspects and their equivalents. Other advantages and novel features of the disclosure will become apparent from the following detailed description of the disclosure when considered in conjunction with the drawings.

BRIEF DESCRIPTION OF THE DRAWINGS

Aspects of the disclosure are understood from the following detailed description when read with the accompanying drawings. It will be appreciated that elements and structures of the drawings are not necessarily drawn to scale. Accordingly, the dimensions of the same may be arbitrarily increased or reduced for clarity of discussion, for example.

DETAILED DESCRIPTION

Figure 1:
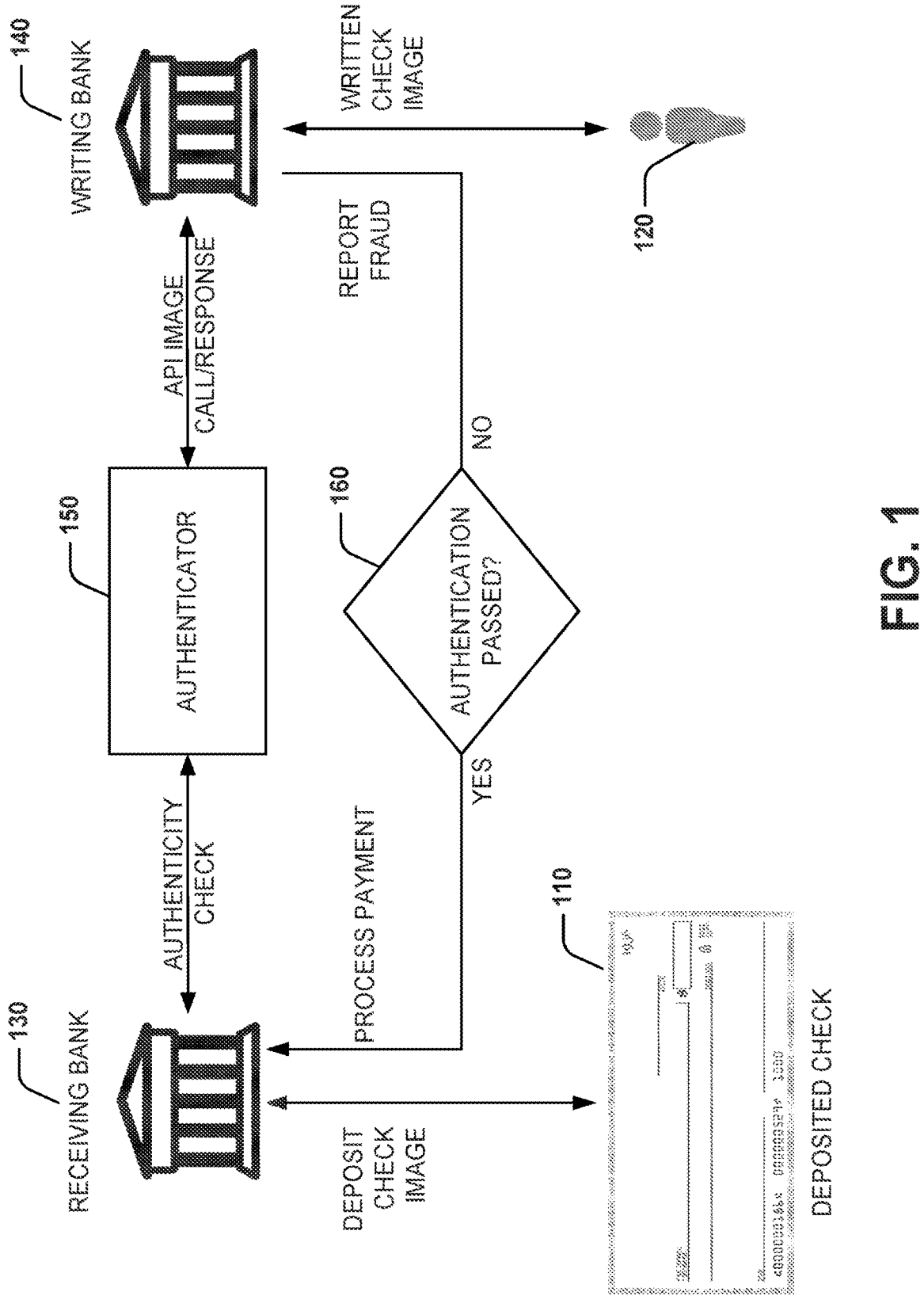
FIG. 1 illustrates a high-level diagram of the subject disclosure according to aspects herein.

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components can reside within a process or thread of execution, and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 1 illustrates a high-level view of the subject disclosure according to aspects herein. A deposited check 110 from a payer 120 can be submitted to or received by a receiving institution 130. In some embodiments, the deposited check 110 may be an image of a check for deposit. For example, a payee may capture an image of a check for deposit via a mobile application of a mobile device. The receiving institution 130 can interface with a writing institution 140 via an authenticator 150. The writing institution 140 can be associated with the payer 120 or an account of the payer 120. The receiving institution 130 can submit an authenticity check to the authenticator 150. The authenticator 150 can interface with the writing institution 140 via an application programming interface API. The authenticator 150 can call or retrieve data from the writing institution 140.

The authenticator 150 can interface with the writing institution 140 to determine whether a reference image of the check has been provided by the payer 120. In some embodiments, the reference image may be an image of the check written by the payer 120. For example, the payer 120 may capture an image of a check via a mobile application of a mobile device when the payer 120 transfers the check to the payee. If the reference image is provided, authenticator 150 can compare the reference image to the captured image of the check 110. The authenticator 150 can determine a match between the two images to authenticate the deposit of the check 110 to the payee's financial account or checking account. In some embodiments, the authenticator 150 can utilize computer vision, a matching algorithm, pixel matching, or the like to determine whether there is a match between the reference image and the deposited check 110. If the authenticator 150 determines a match, the authenticator 150 can allow or permit the check 110 to be deposited to the financial account of the payee at the receiving institution 130 with a transfer of funds from payer's financial account with the writing institution 140 to payee's financial account with the receiving institution 130. If the authenticator 150 determines that the images do not match, the authenticator 150 can prevent the check 110 from being deposited into the financial account with the receiving institution 130.

In some embodiments, the authenticator 150 can determine that a reference image was not provided by the payer 120. If no image is provided, the authenticator 150 can analyze handwriting that appears in the image of the deposited check 110. The authenticator 150 can analyze the handwriting according to a handwriting recognition algorithm. In some embodiments, the authenticator 150 can analyze the handwriting according to a trained handwriting model. The authenticator 150 via the handwriting model can determine a similarity score that enumerates the likelihood that handwriting within the captured image of the deposited check 110 to a handwriting model of the payer 120 to determine a match of handwriting. In some embodiments, the handwriting model can be trained via a machine learning technique and historical handwriting data or check data of the payer 120.

The authenticator 150 can determine whether there is a match of handwriting based on the handwriting model of the payer 120. If the authenticator 150 determines a match of handwriting, the authenticator 150 can authenticate the deposited check 110. The authenticator 150 can determine whether the deposited check 110 is authenticated via process 160. If the deposited check 110 is authenticated, the authenticator 150 can allow or permit the check 110 to be deposited to the account of the payee at the receiving institution 130. If the deposited check 110 is not authenticated, the authenticator 150 can perform or activate security controls. For example, the authenticator 150 can send a notification to the payer 120 or writing institution 140 for confirmation of the check.

Figure 2:
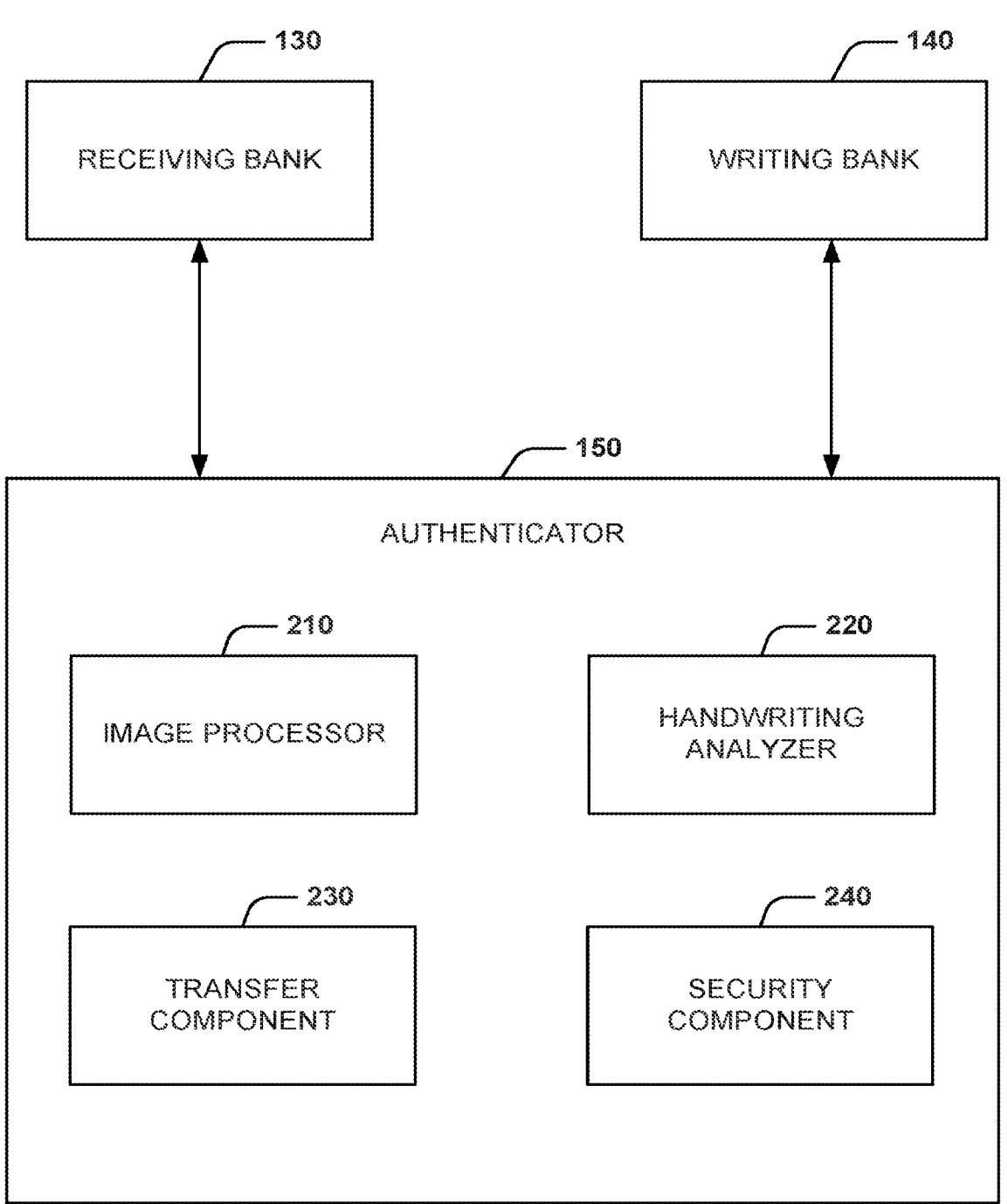
FIG. 2 illustrates an example component diagram of an authenticator.

FIG. 2 illustrates a detailed component diagram of the authenticator 150. The authenticator 150 includes an image processor 210, a handwriting analyzer 220, a transfer component 230, and a security component 240. The image processor 210 can receive an image of a deposited check 110 of a payee from a receiving institution 130. For example, a payee may capture an image of a check 110 for deposit via a mobile application of a mobile device. The receiving institution 130 can submit an authenticity check to the image processor 210. The image processor 210 can interface with the writing institution 140 via an application programming interface API to determine whether a reference image of the check 110 has been provided to the writing institution 140 by the payer 120.

The image processor 210 can interface with the writing institution 140 to determine whether a reference image of the check has been provided by the payer 120. In some embodiments, the reference image may be an image of the check written by the payer 120. For example, the payer 120 may capture an image of a check via a mobile application of a mobile device when the payer 120 transfers the check to the payee. If the reference image is provided, the image processor 210 can compare the reference image to the captured image of the check 110. The image processor 210 can determine a match between the two images to authenticate the deposit of the check 110 to the payee's financial account or checking account. In some embodiments, the image processor 210 can utilize computer vision, a matching algorithm, pixel matching, or the like to determine whether there is a match between the reference image and the deposited check 110. If the image processor 210 determines a match, the transfer component 230 can allow or permit the check 110 to be deposited to the financial account of the payee at the receiving institution 130 with a transfer of funds from payer's financial account with the writing institution 140 to payee's financial account with the receiving institution 130. If the image processor 210 determines that the images do not match, the transfer component 230 or security component 240 can prevent the check 110 from being deposited to the financial account with the receiving institution 130.

In some embodiments, the image processor 210 can analyze the image of the deposited check 110 according to a color model. The color model determines a likelihood that the captured image is of an altered check. The image processor 210 can compare the likelihood to a color change threshold. The image processor 210 can determine whether the deposited check 110 was tampered with (e.g., washed) based on the comparison or the likelihood that the captured image is of an altered check.

In some embodiments, the image processor 210, the authenticator 150, or both can determine that a reference image was not provided by the payer 120. If no image is provided, the handwriting analyzer 220 can analyze handwriting that appears in the image of the deposited check 110. The handwriting analyzer 220 can analyze the handwriting according to a handwriting recognition algorithm. In some embodiments, the handwriting analyzer 220 can analyze the handwriting according to a trained handwriting model. The handwriting analyzer 220 via the handwriting model can determine a similarity score that enumerates the likelihood that handwriting within the captured image of the deposited check 110 to a handwriting model of the payer 120 to determine a match of handwriting. In some embodiments, the handwriting model can be trained via a machine learning technique and historical handwriting data or check data of the payer 120.

In some embodiments, the handwriting analyzer 220 can train the handwriting model with a check history associated with the payer 120. The handwriting analyzer 220 can retrieve the check history from the writing institution 140. The handwriting analyzer 220 can interface with a server of the writing institution 140 to retrieve account data or a check history of the payer 120 as a training dataset. The handwriting analyzer 220 can invoke the handwriting model to determine the likelihood that writing on the captured image of the check matches the payer. The handwriting analyzer 220 can, via the handwriting model, output a likelihood that writing on the captured image of the deposited check 110 is matched to the payer.

The handwriting analyzer 220 can determine whether there is a match of handwriting based on the handwriting model of the payer 120. If the handwriting analyzer 220 determines a handwriting match, the transfer component 230 can authenticate the deposited check 110. The transfer component 230 can determine whether the deposited check 110 is authenticated via process 160. If the deposited check 110 is authenticated, the transfer component 230 can allow or permit the check 110 to be deposited to the account of the payee at the receiving institution 130.

If the deposited check 110 is not authenticated, the security component 240 can perform or activate security controls. For example, the security component 240 can send a notification to the payer 120 or writing institution 140 for confirmation of the check. In other embodiments, the security component 240 can analyze an endorsement of the check according to a handwriting model trained with a plurality of handwriting profiles. The security component 240 can match the endorsement to a handwriting profile of the plurality of profiles. The security component 240 can identify the payee based on the matching. The security component 240 can notify the payer 120, the writing institution 140, the receiving institution 130, law enforcement officers, or the like. The security component 240 can provide the identification for a fraud inquiry into the person that attempted to deposit the check.

Figure 3:
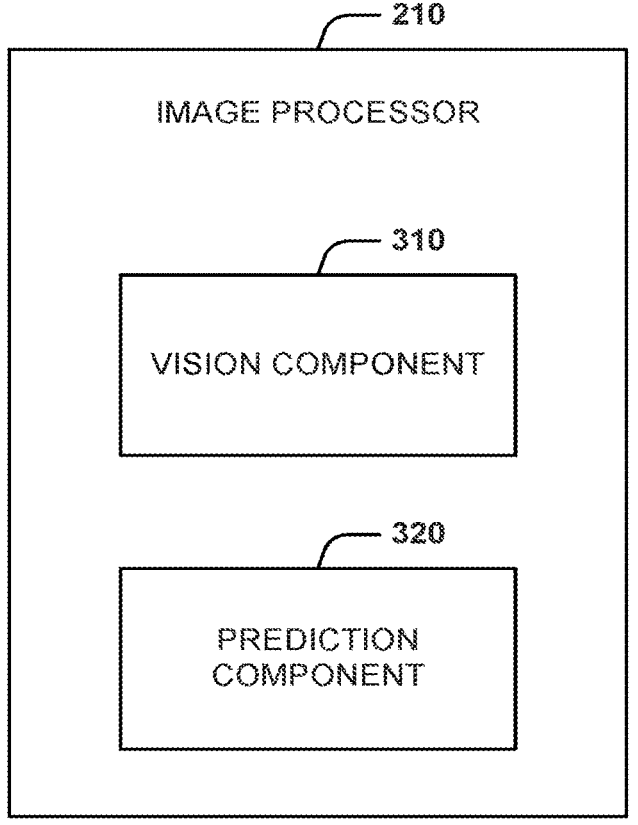
FIG. 3 illustrates an example component diagram of an image processor.

FIG. 3 illustrates a detailed component diagram of the image processor 210. The image processor 210 includes a vision component 310 and a prediction component 320. If the reference image is provided, the vision component 310 can compare the reference image to the captured image of the check 110. The vision component 310 can determine a match between the two images to authenticate the deposit of the check 110 to the payee's financial account or checking account. In some embodiments, the vision component 310 can utilize computer vision, a matching algorithm, pixel matching, or the like to determine whether there is a match between the reference image and the deposited check 110. In some embodiments, the vision component 310 can perform a pixel-by-pixel comparison between the reference image and the captured image of the check 110.

In some embodiments, the prediction component 320 can analyze the image of the deposited check 110 according to a color model. The color model determines a likelihood that the captured image is of an altered check. The prediction component 320 can compare the likelihood to a color change threshold. The prediction component 320 can determine whether the deposited check 110 was tampered with (e.g., washed or the like) based on the comparison or the likelihood that the captured image is of an altered check. For example, the prediction component 320 can determine ink bleed, fading, watermark tampering, erased writing, or the like. The prediction component 320, via the color model, can output the likelihood that the color matches a color profile of the reference image or a check history.

The prediction component 320 can train the color model via a check history associated with the writing institution

140 or the payer 120. The prediction component 320 can utilize a machine learning technique to determine trends between deposited checks of the payer 120 or other customers of the writing institution 140. The prediction component 320 learns from existing data to make predictions about deposited checks written by the payer 120. The prediction component 320 builds the color model from the check history (e.g., "training data set") to make data-driven predictions or decisions expressed as outputs or assessments for the payer 120. The prediction component 320 can determine the trends or correlations within the check history. For example, the color model can factor in a common writing utensil that the payer 120 uses to write some or all of their checks. In some embodiments, the prediction component 320 utilizes the machine learning technique to analyze the check history across different customers of the writing institution 140 or the like to determine a color model based on correlations in the check history from the writing institution 140.

The prediction component 320 applies the color model to deposited check 110 to determine a recommendation or likelihood based on the trends revealed by the machine learning and the check history of the payer 120 or the writing institution 140. The prediction component 320 via the color model can determine an output as a likelihood for the authenticator 150 or the payer 120.

If the vision component 310 determines a match or the prediction component 320 determines the deposited check is likely authentic, the authenticator 150 can allow or permit the check 110 to be deposited to the financial account of the payee at the receiving institution 130 with a transfer of funds from payer's financial account with the writing institution 140 to payee's financial account with the receiving institution 130. If the vision component 310 determines no match or the prediction component 320 determines the deposited check is not likely authentic, the authenticator 150 can prevent the check 110 from being deposited to the financial account with the receiving institution 130.

Figure 4:
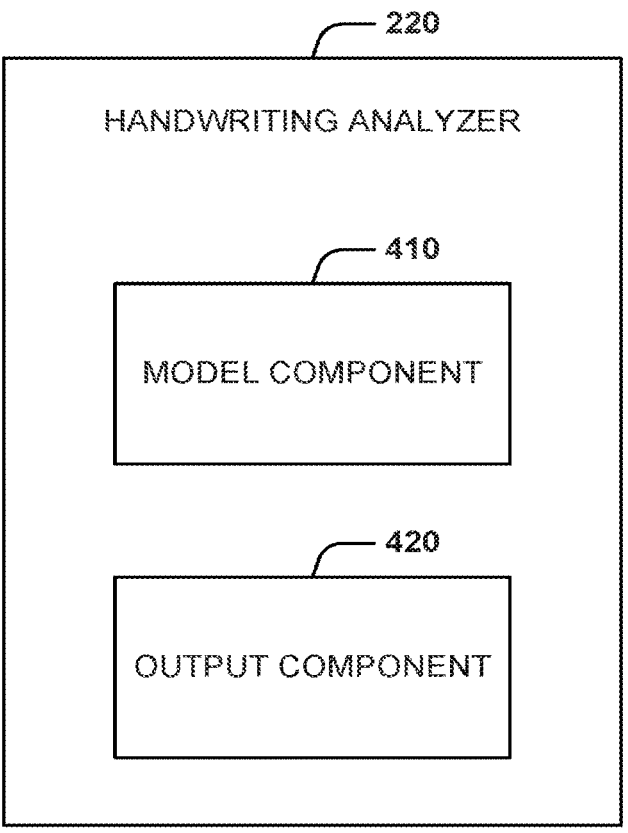
FIG. 4 illustrates an example component diagram of a handwriting analyzer.

FIG. 4 illustrates a component diagram of a handwriting analyzer 220. The handwriting analyzer 220 includes a model component 410 and an output component 420. In some embodiments, the model component 410 can determine that a reference image was not provided by the payer 120. If no image is provided, the model component 410 can analyze handwriting that appears in the image of the deposited check 110. The model component 410 can analyze the handwriting according to a handwriting recognition algorithm. In some embodiments, the model component 410 can analyze the handwriting according to a trained handwriting model. In some embodiments, the handwriting model can be trained via a machine learning technique and historical handwriting data, check data of the payer 120, or both.

In some embodiments, the model component 410 can train the handwriting model with a check history associated with the payer 120. The model component 410 can retrieve the check history from the writing institution 140. The model component 410 can interface with a server of the writing institution 140 to retrieve account data or a check history of the payer 120 as a training dataset. The output component 420 can invoke the handwriting model to determine the likelihood that writing on the captured image of the check matches the payer. The output component 420 can, via the handwriting model, output a likelihood that writing on the captured image of the deposited check 110 is matched to the payer.

In some embodiments, the model component 410 can analyze the image of the deposited check 110 according to a handwriting model. The handwriting model determines a likelihood that the handwriting found on the captured image of the deposited check 110 is of an altered check. The model component 410 can compare the likelihood to a similarity threshold. The model component 410 can determine whether the deposited check 110 was tampered with (e.g., the handwriting has been changed, altered, added to) based on the comparison or the likelihood that the captured image is of an altered check. For example, the model component 410 can determine whether the date, numerical amount writing, memorandum, signature, or the like matches a handwriting model of the payer 120.

The model component 410 can train the handwriting model via a check history associated with the writing institution 140 or the payer 120. The model component 410 can utilize a machine learning technique to determine trends between deposited checks of the payer 120 or other customers of the writing institution 140. The model component 410 learns from existing data to make predictions about deposited checks written by the payer 120. The model component 410 builds the handwriting model from the check history (e.g., "training data set") to make data-driven predictions or decisions expressed as outputs or assessments for the payer 120. The model component 410 can determine the trends or correlations within the check history. For example, the handwriting model can factor in a common writing utensil that the payer 120 uses to write some or all of their checks. In some embodiments, the model component 410 utilizes the machine learning technique to analyze the check history across different customers of the writing institution 140 or the like to determine a handwriting model based on correlations in the check history from the writing institution 140.

The output component 420 can apply the handwriting model to deposited check 110 to determine a recommendation or likelihood based on the trends revealed by the machine learning and the check history of the payer 120 or the writing institution 140. The output component 420 via the handwriting model can determine an output as a likelihood for the authenticator 150 or the payer 120. In some embodiments, the output component 420 via the handwriting model can determine a similarity score that enumerates the likelihood that handwriting within the captured image of the deposited check 110 to a handwriting model of the payer 120 to determine a match of handwriting.

Figure 5:
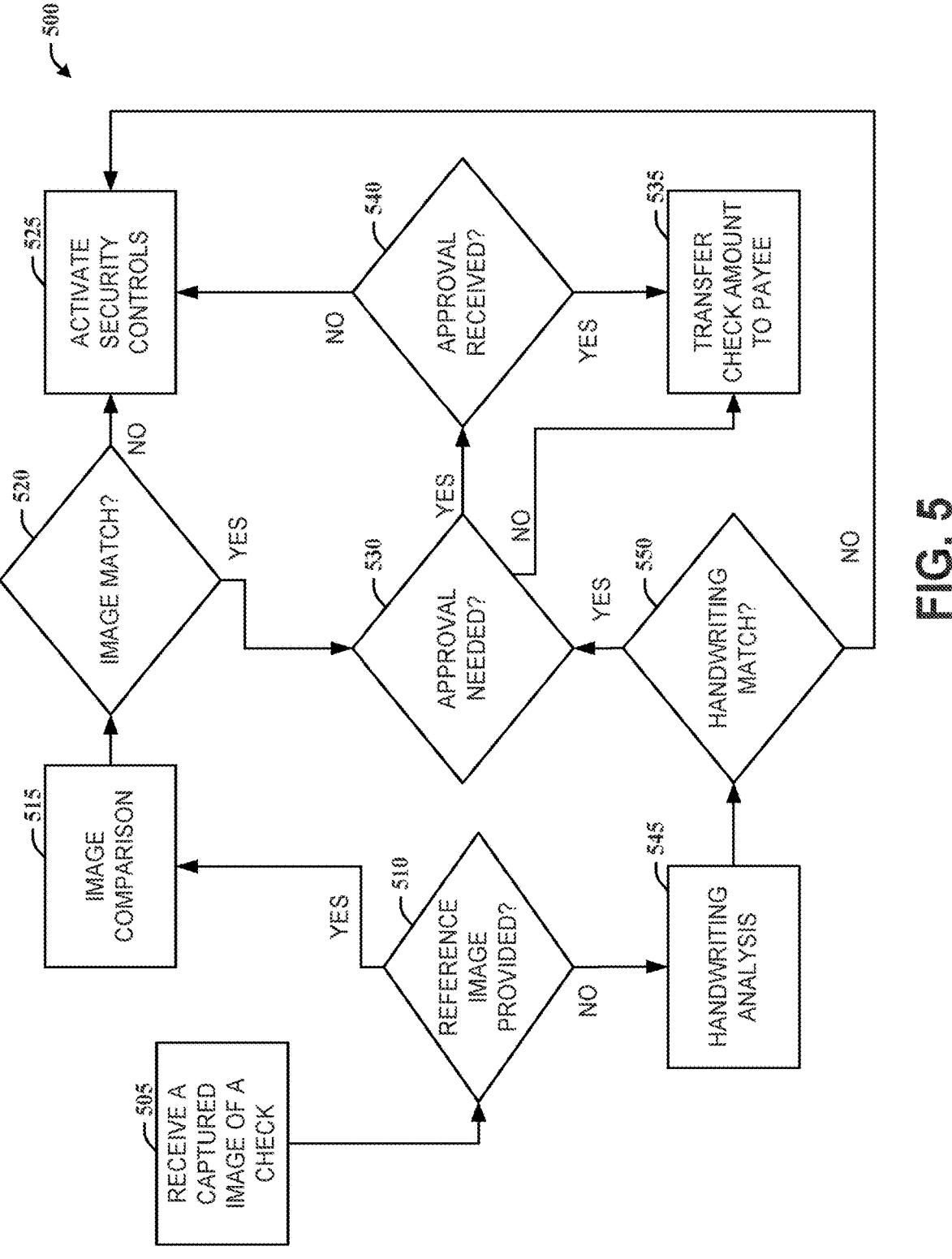
FIG. 5 illustrates an example method.

With reference to FIG. 5, example method 50) is depicted for authenticating a user to verify identity. While, for purposes of simplicity of explanation, the one or more methodologies shown herein, e.g., in the form of a flow chart, are shown and described as a series of acts, it is to be understood and appreciated that the subject disclosure is not limited by the order of acts, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosure. It is also appreciated that the method 500 is described in conjunction with a specific example for explanation purposes.

FIG. 5 illustrates a method 500 for checking fraud detection. At step 505, a captured image of a check for deposit can be received. The captured image can be received at a receiving institution or at the authenticator 150. At step 510, the authenticator 150 can determine whether a reference image of the check has been provided by the payer 120. The authenticator 150 can interface with the writing institution 140 to determine if a reference image is provided. If a reference image has been provided, at step 515, a comparison between the captured image and the reference image is conducted. At step 520, a determination is made of whether the captured image matches the reference image. The determination may be made based on the comparison between the captured image and the reference image. In some embodiments, the determination is based on a likelihood of a match that is output by a color model or computer vision technique and a comparison to a threshold likelihood. If the determination is that there is no match between the images, at step 525, security controls are activated. The authenticator 150 can provide an alert to the payer, freeze one or more accounts, alert the writing institution or receiving institution, or both. If the determination is a match between the images, at step 530, a preference check is conducted to determine whether the payer 120 should provide approval. If no approval is needed, at step 535, the check can be deposited as a transfer from the account of the payer 120 to the account of the payee. If approval is needed, at step 540, a determination is made whether approval has been provided. If approval has been provided, the check can be deposited as a transfer from the account of the payer 120 to the account of the payee. If approval has not been provided, the authenticator 150 can wait for approval or activate security controls at step 525.

Returning back to step 510, if no reference image has been provided, at step 545, handwriting analysis is performed. At step 550, a determination is made of whether the handwriting in the captured image matches a handwriting profile of the payer 120 via a handwriting model. The determination may be made based on the comparison between handwriting on the check in the captured image and a handwriting profile. In some embodiments, the determination is based on a likelihood of a match that is output by a handwriting model and a comparison to a threshold likelihood. The handwriting model may be trained using a check history of the payer as a training dataset and a machine learning technique. If the determination is there is no match of handwriting, the method 500 reverts to step 525, such that security controls are activated. The authenticator 150 can provide an alert to the payer, freeze one or more accounts, alert the writing institution or receiving institution, or the like. If the determination is a match of handwriting, the method 500 reverts to step 530, where a preference check is conducted to determine whether the payer 120 should provide approval. If no approval is needed, at step 535, the check can be deposited as a transfer from the account of the payer 120 to the account of the payee. If approval is needed, at step 540, a determination is made whether approval has been provided. If approval has been provided, the check can be deposited as a transfer from the account of the payer 120 to the account of the payee. If approval has not been provided, the authenticator 150 can wait for approval or activate security controls at step 525.

As used herein, the terms "component" and "system," as well as various forms thereof (e.g., components, systems, sub-systems), are intended to refer to a computer-related entity, either hardware, a combination of hardware and software, software, or software in execution. For example, a component may be but is not limited to a process running on a processor, a processor, an object, an instance, an executable, a thread of execution, a program, or a computer. By way of illustration, both an application running on a computer and the computer can be a component. One or more components may reside within a process or thread of execution, and a component may be localized on one computer or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
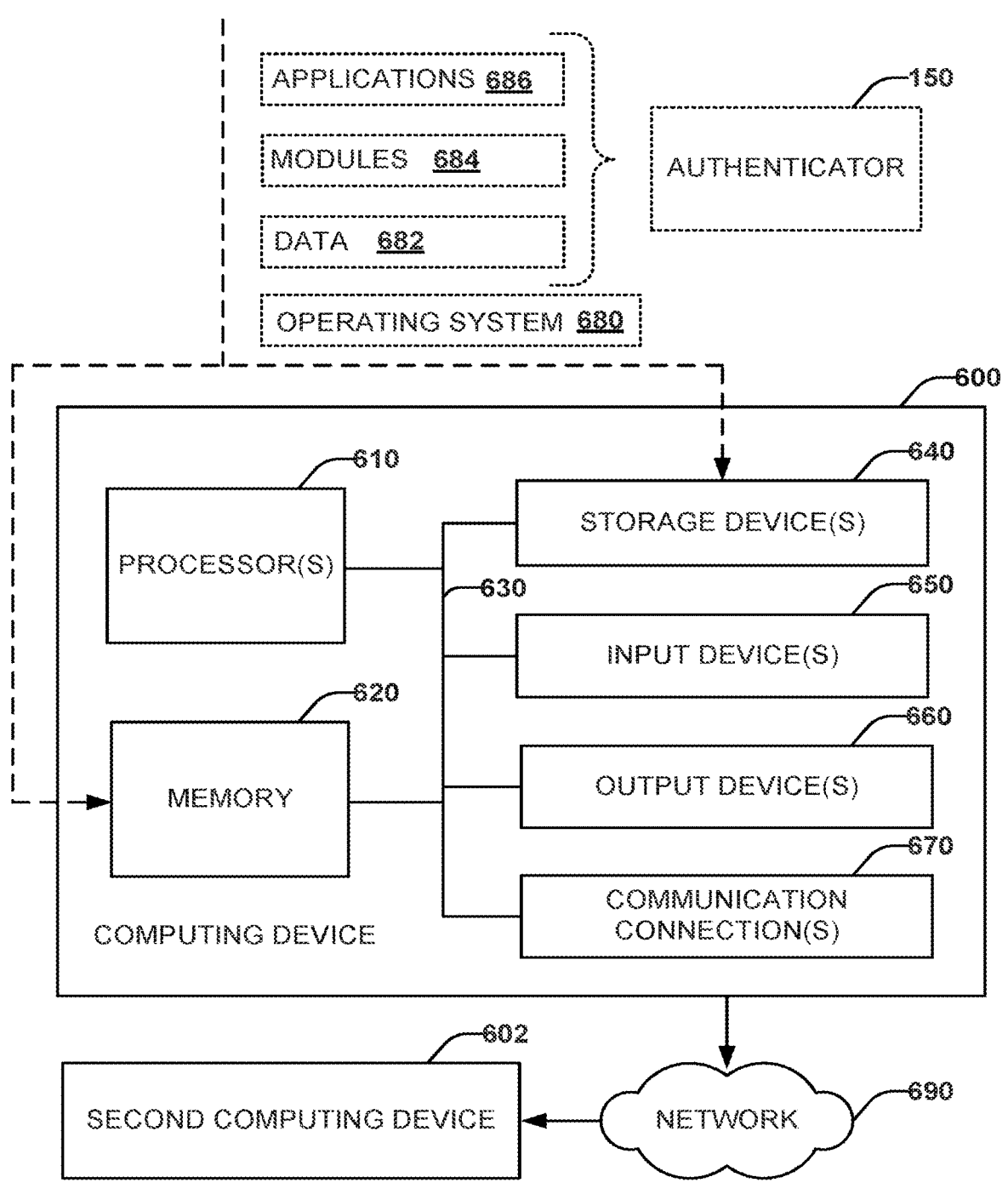
FIG. 6 illustrates a computing environment where one or more of the provisions set forth herein can be implemented, according to some embodiments.

To provide a context for the disclosed subject matter, FIG. 6 and the following discussion are intended to provide a brief, general description of a suitable environment in which various aspects of the disclosed subject matter can be implemented. The suitable environment, however, is solely an example and is not intended to suggest any limitation as to the scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, which perform particular tasks or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 6, illustrated is an example computing device 600 (e.g., desktop, laptop, tablet, watch, server, hand-held, programmable consumer or industrial electronics, set-top box, game system, compute node . . . ). The computing device 600 includes one or more processor(s) 610, memory 620, system bus 630, storage device(s) 640, input device(s) 650, output device(s) 660, and communications connection(s) 670. The system bus 630 communicatively couples at least the above system constituents. However, the computing device 600, in its simplest form, can include one or more processors 610 coupled to memory 620, wherein the one or more processors 610 execute various computer executable actions, instructions, and or components stored in the memory 620.

The processor(s) 610 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 610 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 610 can be a graphics processor unit (GPU) that performs calculations with respect to digital image processing and computer graphics.

The computing device 600 can include or otherwise interact with a variety of computer-readable media to facilitate control of the computing device to implement one or more aspects of the disclosed subject matter. The computer-readable media can be any available media accessible to the computing device 600 and includes volatile and nonvolatile media, and removable and non-removable media. Computer-readable media can comprise two distinct and mutually exclusive types: storage media and communication media.

Storage media includes volatile and nonvolatile, removable, and non-removable media implemented in any method or technology for storing information such as computer-readable instructions, data structures, program modules, or other data. Storage media includes storage devices such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid state devices (e.g., solid state drive (SSD), flash memory drive (e.g., card, stick, key drive)), or any other like mediums that store, as opposed to transmit or communicate, the desired information accessible by the computing device 600. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 620 and storage device(s) 640 are examples of computer-readable storage media. Depending on the configuration and type of computing device, the memory 620 may be volatile (e.g., random access memory (RAM)), nonvolatile (e.g., read only memory (ROM), flash memory . . . ), or some combination of the two. By way of example, the basic input/output system (BIOS), including basic routines to transfer information between elements within the computing device 600, such as during start-up, can be stored in nonvolatile memory. In contrast, volatile memory can act as external cache memory to facilitate processing by the processor(s) 610, among other things.

The storage device(s) 640 include removable/non-removable, volatile/nonvolatile storage media for storing vast amounts of data relative to the memory 620. For example, storage device(s) 640 include but are not limited to one or more devices such as a magnetic or optical disk drive, floppy disk drive, flash memory, solid-state drive, or memory stick.

Memory 620 and storage device(s) 640 can include or have stored therein operating system 680, one or more applications 686, one or more program modules 684, and data 682. The operating system 680 acts to control and allocate resources of the computing device 600. Applications 686 include one or both of system and application software and can exploit management of resources by the operating system 680 through program modules 684 and data 682 stored in the memory 620 or storage device(s) 640 to perform one or more actions. Accordingly, applications 686 can turn a general-purpose computer 600 into a specialized machine per the logic provided.

All or portions of the disclosed subject matter can be implemented using standard programming or engineering techniques to produce software, firmware, hardware, or any combination thereof to control the computing device 600 to realize the disclosed functionality. By way of example and not limitation, all or portions of the authenticator 150 can be, or form part of, the application 686, and include one or more modules 684 and data 682 stored in memory or storage device(s) 640 whose functionality can be realized when executed by one or more processor(s) 610.

In accordance with one particular embodiment, the processor(s) 610 can correspond to a system on a chip (SOC) or like architecture including, or in other words integrating, hardware and software on a single integrated circuit substrate. Here, the processor(s) 610 can include one or more processors as well as memory at least similar to the processor(s) 610 and memory 620, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the authenticator 150 or associated functionality can be embedded within hardware in a SOC architecture.

The input device(s) 650 and output device(s) 660 can be communicatively coupled to the computing device 600. By way of example, the input device(s) 650 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 660, by way of example, can correspond to a display device (e.g., liquid crystal display (LCD), light emitting diode (LED), plasma, organic light-emitting diode display (OLED)), speakers, voice user interface system, printer, and vibration motor, among other things. The input device(s) 650 and output device(s) 660 can be connected to the computing device 600 by way of wired connection (e.g., bus), wireless connection (e.g., Wi-Fi, Bluetooth), or a combination thereof.

The computing device 600 can also include communication connection(s) 670 to enable communication with at least a second computing device 602 by means of a network 690. The communication connection(s) 670 can include wired or wireless communication mechanisms to support network communication. The network 690 can correspond to a local area network (LAN) or a wide area network (WAN) such as the Internet. The second computing device 602 can be another processor-based device with which the computing device 600 can interact. For example, the computing device 600 can correspond to a server that executes functionality of authenticator 150, and the second computing device 602 can be a user device that communicates and interacts with the computing device 600.

What has been described above includes examples of aspects of the claimed subject matter. Of course, describing every conceivable combination of components and methods for describing the claimed subject matter is impossible. Still, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system to improve efficiency of image processing using multiple machine learning models that include a first machine learning model and a second machine learning model, the system comprising:

memory; and one or more processors, coupled to the memory, configured to cause the system to:

receive, using a captured image, of a check that includes handwriting, that is captured via a mobile application;

interface with a server, of an institution that is associated with the check, to retrieve, from the institution that is associated with the check, data or history associated with the institution or a provider of the check as a training data set that indicates a handwriting profile;

train the second machine learning model based on the training data set after the training data set is retrieved from the institution that is associated with the check;

reserve an execution of the second machine learning model for the captured image until the first machine learning model is insufficient for the captured image;

interface, via an application programming interface (API), with the institution to determine whether a reference image has been provided to the institution by the provider of the check;

determine that the reference image is not available for use of the first machine learning model for the captured image based on interfacing with the institution to determine whether the reference image has been provided to the institution by the provider of the check; and perform the execution of the second machine learning model for the captured image based on reserving the execution of the second machine learning model until the first machine learning model is insufficient for the captured image and based on determining that the reference image is not available for use of the first machine learning model for the captured image.

2. The system of claim 1, wherein the one or more processors are further configured to cause the system to:

activate controls based on performing the execution of the second machine learning model.

3. A method for image processing using multiple machine learning models, comprising:

receiving a captured image of a check that includes handwriting;

determining, by interfacing with a server over a network, that a reference image, corresponding to the captured image, is not available for use of a first machine learning model, of the multiple machine learning models, for the captured image; and performing an execution of a second machine learning model, of the multiple machine learning models and is trained with a training data set that indicates at least one handwriting profile, for the captured image based on determining that the reference image is not available for use of the first machine learning model for the captured image.

4. The method of claim 3, wherein receiving the captured image comprises:

receiving the captured image via a mobile application of a mobile device.

5. The method of claim 3, wherein determining that the reference image is not available for use of the first machine learning model for the captured image comprises:

determining that the reference image has not been provided for the captured image.

6. A method for detecting check alteration by using multiple machine learning models for image processing, comprising:

receiving a captured image;

determining whether a reference image, corresponding to the captured image, is available for use of a first machine learning model, of the multiple machine learning models, for the captured image; and performing an execution of the first machine learning model for the captured image based on determining whether the reference image is available for use of the first machine learning model for the captured image, wherein the first machine learning model includes a color model that determines a likelihood that the captured image is of an altered check and that is trained based on a training data set that indicates a handwriting profile.

7. The method of claim 6, further comprising:

training, using a machine learning technique, the color model via a history associated with the captured image.

8. The method of claim 3, wherein the second machine learning model includes a handwriting model that is configured to determines a likelihood that the handwriting is matched to a creator associated with the captured image.

9. The method of claim 8, further comprising:

training the handwriting model using a machine learning technique and historical data that indicates the at least one handwriting profile.

10. The method of claim 8, wherein the at least one handwriting profile includes a handwriting profile of the creator.

11. The method of claim 3, further comprising:

activating controls based on performing the execution of the second machine learning model.

12. The method of claim 6, further comprising:

determining whether the captured image matches the reference image after performing the execution of the first machine learning model; and activating security controls or determining whether approval is needed based on whether the captured image matches the reference image.

13. The method of claim 3, further comprising:

sending a notification for confirmation of a mismatch based on performing the execution the second machine learning model.

14. The method of claim 6, wherein the captured image is an image captured via a mobile application of a mobile device.

15. The method of claim 6, wherein the captured image is of a deposited check.

16. The method of claim 15, wherein the deposited check includes handwriting.

17. The method of claim 15, further comprising:

determining that the deposited check was tampered with based on the likelihood that the captured image is of an altered check.

18. The system of claim 1, wherein the second machine learning model is a trained handwriting model.

19. The method of claim 3, wherein the second machine learning model is trained via a machine learning technique and historical handwriting data or check data of a payer associated with the check.

* * * * *